June 27, 1967   B. R. THOMPSON   3,327,865
SCREENS, STRAINERS AND THE LIKE
Filed June 9, 1964
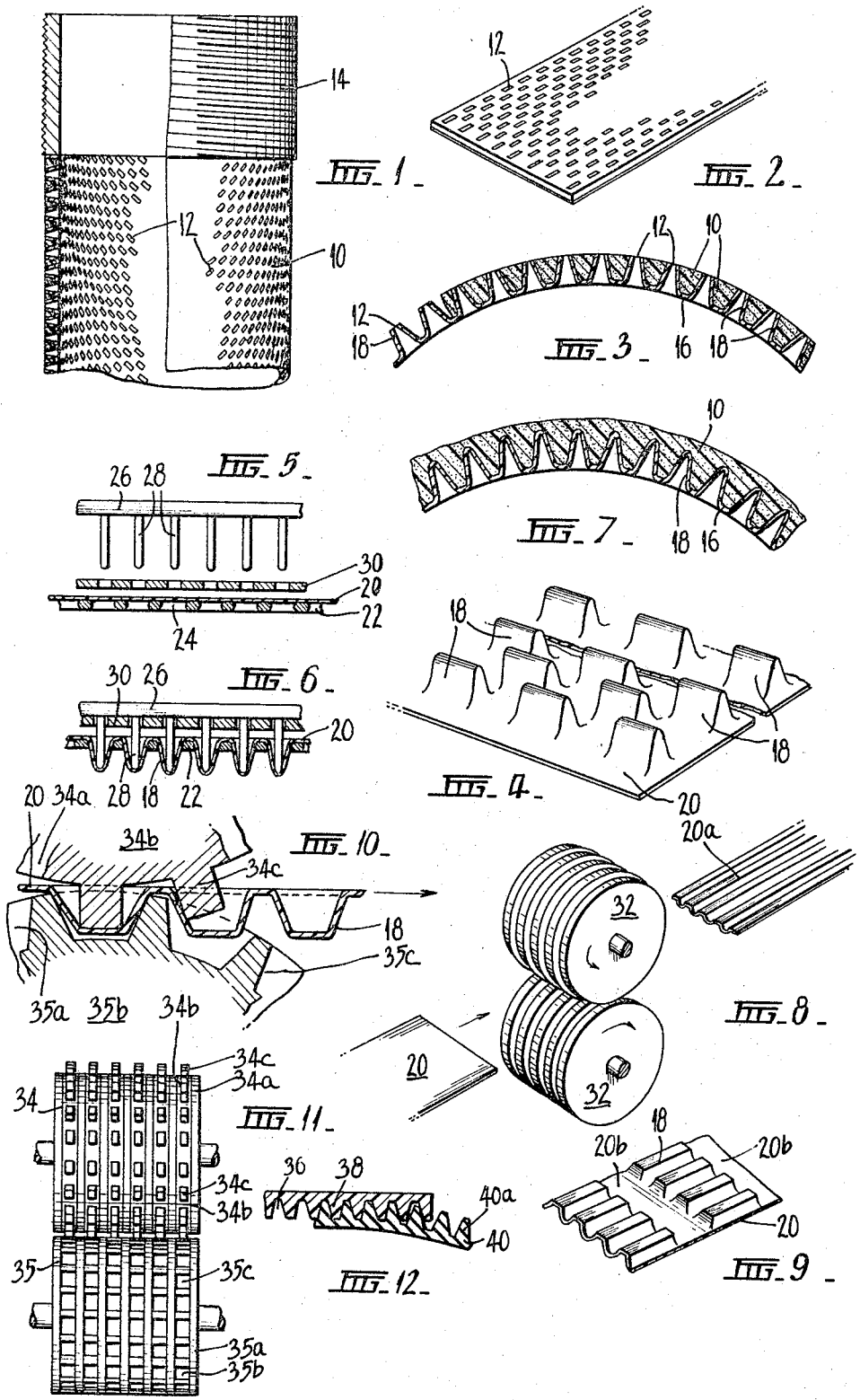

United States Patent Office 3,327,865
Patented June 27, 1967

3,327,865
SCREENS, STRAINERS AND THE LIKE
Bruce Roy Thompson, 4 Mathoura Road, Toorak,
Victoria, Australia
Filed June 9, 1964, Ser. No. 373,610
Claims priority, application Australia, June 11, 1963,
31,665/63
4 Claims. (Cl. 210—497)

This invention relates to screens, strainers and the like, hereinafter comprehended by the term screens, and refers especially, but is not limited, to tubular screens, such as well screens and tubular filter screens.

One object of this invention is to provide improvements in screens for liquids and especially in tubular screens, including screens for subterranean water and oil wells.

The invention includes a screen having a molded plastic body of substantially uniform thickness provided with a plurality of holes extending therethrough and wherein the open ends of said holes are of larger size at one side of the body than at the other side thereof.

Preferably, the plastic body is of composite construction and comprises at one side thereof a plastic member formed with spaced hollow projections which extend to the opposite side of the screen and a substantially thicker reinforcing layer of molded plastic material in which said hollow projections are embedded and which has its outer surface flush with the free ends thereof.

The invention comprises forming a plastic body of substantially uniform thickness having therein a plurality of spaced holes which extend inwardly from one side thereof and which have substantially closed inner ends disposed at or near the opposite side of the body and subsequently removing said substantially closed ends of the holes from the said opposite side of the body whereby the holes then extend uninterruptedly therethrough.

More particularly, the holes in the body as originally formed preferably terminate short of said opposite side of the body and the closed inner ends thereof are removed by removing material from said opposite side of the body whereby the thickness thereof is reduced.

Preferably, the holes are of convergent shape, that is to say, the cross-sectional area thereof is smaller at one side of the screen than at the opposite side thereof. Thus, the screen is self-clearing as any solid particles capable of passing into the reduced ends of the holes will pass freely therethrough to the discharge side of the screen. Also, when the holes are convergent, the size of the inlet ends thereof may be increased by further reducing the thickness of the screen by removing a layer from the corresponding side thereof as by a cutting or grinding operation.

Preferably, the plastic body is formed by molding it about a plurality of spaced projections provided on one side of a mold member so that the projections are embedded therein, the thickness of the plastic layer as initially formed being preferably greater than the length of the projections which may be of any required cross-sectional shape.

The mold member may be formed of a readily soluble material, e.g. starch, or a readily fusible material, e.g. wax, whereby it may subsequently be dissolved or melted to remove it from the plastic molding. Alternatively, the mold member may be formed of material which does not adhere to and is capable of being readily stripped from the plastic molding. Thus the mold member may, for example, have the form of a rubber mat having the projections formed on one face thereof.

According to still another and preferred form of the invention, the mold member comprises a thin sheet of plastic or other suitable material and the projections provided on one side thereof are hollow but are substantially closed at their free ends and are permanently embedded in the molded plastic layer which preferably is formed of a thermosetting resin such as an epoxy or polyester resin. Subsequently, the outer surface portion of the molded layer is removed to a depth such that the closed free ends of the hollow projections are also removed so that the holes then form passages which extend completely through the screen.

A screen so produced is thus of composite construction as the mold member itself forms the inner member of the screen and the molded plastic layer serves essentially as a reinforcement for the hollow projections thereon.

Preferably, the molded plastic layer is reinforced by embedding fiberglass, asbestos, metal wire or other suitable material therein and this reinforcing material may be threaded between the projections on the mold member before the said plastic layer is molded thereon or it may be, and preferably is, incorporated in the molding material before the latter is molded.

The preformed inner member of the screen may be formed in any convenient way, such as by blow or pressure molding or by vacuum forming, but it is preferably formed from a thin sheet of thermoplastic material by heating the latter and by then subjecting it to a pressing, drawing or rolling operation to form the aforesaid hollow projections thereon. Thus, for example, the sheet in a heat softened condition may be arranged between two plates, one of which is provided with spaced apertures while the other plate is provided with corresponding projecting pins of a suitable length and a smaller cross-sectional area. Thus the pins, which are preferably blunt or rounded at their free ends, are utilized to draw the heat softened sheet material through the holes to form tapered hollow projections thereon.

The inner screen member, which serves also as the mold member, may be initially produced in flat sheet form and may subsequently be formed to the tubular or other required shape of the screen to be produced. Thus, for example, a tubular well screen may be formed from a flat sheet having a length equal to the required length of the screen and a width equal to the circumferential length of the inner periphery of the screen, this flat sheet being then wrapped circumferentially about a mandrel of the required diameter with the said projections extending radially outwards therefrom.

Alternatively, and preferably, the said inner member is produced in the form of a long narrow strip or ribbon and is helically wound on the mandrel to form a tube of the requisite length, though the said inner member may, if desired, be molded in the required tubular or other form.

Examples of the invention are hereinafter further described with reference to the accompanying drawings in which:

FIGURE 1 is a view in elevation, partly in section, of one end portion of a tubular well screen, FIGURE 2 is a perspective view of a flat screen, FIGURE 3 is a view in cross-section of a part of the screen shown in FIGURE 1 and is drawn to a larger scale, FIGURE 4 is a perspective view of a strip of formed thermoplastic sheet, FIGURES 5 and 6 are views in sectional elevation illustrating successive stages in the formation of the plastic sheet shown in FIGURE 4, FIGURE 7 is a view similar to FIGURE 3 and shows a stage in the manufacture of the screen, FIGURE 8 is a perspective view of rollers for forming corrugations in a thermoplastic sheet, FIGURE 9 is a perspective view of a formed thermoplastic sheet, FIGURE 10 is a view in side elevation of coacting rollers for forming parallel rows of spaced projections in a thermoplastic sheet, FIGURE 11 is a view in elevation of the rollers shown in FIGURE 10, and FIGURE 12 is a view in sectional elevation illutsrating another method of molding a screen according to the invention.

The well screen shown in FIGURE 1 consists of a plastic tube 10 of a suitable diameter and length which may be open at each end and which is provided with closely spaced radial holes 12 arranged at approximately regular spacings throughout the entire surface thereof between opposite end portions 14 which are formed with external screw threads. When the screen is in use, one end thereof may be connected by the respective screw thread to the lower end of a suction pipe while a closure cap is detachably secured to its opposite end. Alternatively, a sealing ring (not shown) may be screwed onto the upper end of the screen in the known manner to form a seal with the wall of the well casing.

As shown in FIGURE 3, this tubular screen is composite in construction and comprises a thin inner plastic tube 16 formed with spaced tubular projections 18 which extend radially outwards therefrom and which are embedded in and have their outer ends flush with the periphery of the outer plastic tube 10 which is of sufficient wall thickness to impart the requisite strength to the screen. This outer plastic tube is preferably formed of a tough shock-resistant thermosetting resin such as an epoxy resin or a polyester resin.

The thin walled inner tube 16 is preferably thermoplastic and may, for example, be formed from rigid p.v.c. sheet as hereinafter described and the integral tubular projections 18 thereon are outwardly convergent and the openings 12 in their reduced outer ends are of a size appropriate to the purpose for which the screen is to be used.

A preferred method of producing the screen resides in progressively forming the hollow projections 18 in a continuous strip 20 of the thermoplastic material of a suitable width and thickness and this may be accomplished as shown in FIGURES 5 and 6 by placing a heat softened length of the strip on a lower horizontally disposed forming member 22 provided with uniformly spaced openings 24 of a suitable shape, size and spacing. This lower member may consist as shown of a perforated metal plate or it may consist of wire mesh supported and held taut in a surrounding frame.

An upper forming member arranged horizontally above the lower member comprises a plate 26 which is guided for vertical movements towards and from the lower member and the underside of this plate is provided with spaced depending pins 28 which are equal in length and each of which registers with but is smaller in cross-sectional area than the openings 24 in the lower member 22. These pins, which are slightly rounded at their free ends, extend through corresponding clearance holes in a spring-loaded stripper plate 30.

Thus, when the upper member is moved downwards to a suitable extent determined by appropriate stops, the pins draw the heat softened thermoplastic sheet through the openings in the lower member 22 thus forming the hollow downwardly convergent projections 18 which, at this time, are closed at their free ends as shown in FIGURE 6.

After the upper member has been raised, the thermoplastic strip is moved forwardly and the operations are repeated with the next succeeding portion thereof.

A short length of the formed strip is shown in FIGURE 4 wherein the hollow projections 18 are approximately of rectangular shape in cross-section.

The strip 20 thus produced may be formed into a tube by wrapping it helically around a mandrel of the required diameter with the adjacent edges of contiguous convolutions disposed in abutting relationship and with the closed hollow projections radially outwards therefrom.

The outer reinforcing plastic tube 10 is then molded about the perforated inner tube 16 and preferably with a wall thickness such that the hollow projections are completely embedded therein as shown in FIGURE 7, though the closed ends of said projections may, if desired, project from the body. As previously stated, this outer tube 10 is preferably formed of a thermosetting resin such as an epoxy resin having filamentary reinforcing material such as fiberglass incorporated therein, and when this outer tube has been cured, it is firmly bonded to the thermoplastic inner helical tube so that it is not necessary to otherwise secure the convolutions of the latter together.

Finally, the external diameter of the composite tube is reduced by a turning, grinding or other suitable operation until the wall thickness thereof is less than the length of the hollow projections 18 as originally formed. Thus in the course of this operation, the closed outer ends of these projections are also removed so that the holes 12 therein then extend radially therethrough. It will be apparent also that as the projections are outwardly convergent, the inlet openings 12 in the outer surface of the screen may be increased in size by further reducing the wall thickness so that in this way, some useful variation in the size of the openings is obtainable.

A well screen as above described is less expensive to produce than equivalent screens of the kind commonly used for similar purposes and is less prone to mechanical damage and corrosion and/or incrustation and it will be evident that flat screens as shown in FIGURE 2 and screens of other required shapes may be similarly produced.

An alternative procedure for forming spaced hollow projections 18 on the strip 20 is shown in FIGURE 8 wherein the plain heat softened strip is passed between corrugating rollers 32 to form a longitudinally corrugated strip 20a. This corrugated strip, while still in a heat softened condition, is cross-rolled or pressed at spaced intervals to form each longitudinally extending rib thereof into a series of spaced hollow projections 18 separated by flattened portions 20b as shown in FIGURE 9.

According to a further modification shown in FIGURES 10 and 11, the spaced hollow projections 18 are formed directly by passing the sheet 20 between upper and lower rollers 34 and 35 respectively which form interrupted corrugations therein as shown in FIGURE 9. Each of the rollers 34 and 35 is of composite construction and consists of alternately arranged coaxial discs 34a and 34b, and 35a and 35b respectively. The discs 34a and 35a are of plain circular shape and are arranged in coacting pairs while the intermediate discs 34b are formed with spaced radial teeth or projections 34c which press the heat softened sheet into corresponding circumferentially arranged pockets 35c in the periphery of the mating discs 35b.

An alternative method of molding a screen according to the invention is shown in FIGURE 12 wherein blind holes 36 are formed in a molded plastic body 38 by a mold member 40 in the form of a mat of rubber or the like which is stripped from the molding after the latter has set, with this mat being formed with integral spaced projections 40a. Alternatively, the mold member may be formed of readily soluble or readily fusible material.

It will be understood that the several described methods of forming screens according to the invention obviate the complete or partial obstruction of the holes by fins such as usually are unavoidably present when holes open at both ends are formed in molded articles during the molding operation.

This invention is not to be confined to any strict conformity to the showings in the drawings but changes and modifications may be made therein so long as such changes or modifications mark no material departure from the spirit and scope of the appended claims.

I claim:
1. A screen comprising a member of plastic material having a plurality of spaced hollow projections formed integrally therewith and extending outwardly from a surface on one side thereof, said hollow projections being open at both their inner and outer ends, and a substantially thicker reinforcing layer of molded plastic material adjacent said surface of said member and in which said hollow projections are embedded, said reinforcing layer having its inner surface in contact with the adjacent surface of said member and having its outer surface flush with the outer ends of said hollow projections.

2. A screen comprising an inner thermoplastic member of substantially uniform thickness formed with closely spaced similar hollow projections which extend outwardly from one face thereof, said hollow projections being convergent towards their free ends and being open at both their inner and outer ends, and a thicker reinforcing layer of plastic material molded about said projections and adjacent said one face of said member whereby are embedded therein, said reinforcing layer having its inner surface in contact with the adjacent face of the inner member and having its outer surface flush with the outer ends of said hollow projections.

3. A composite screen of tubular form comprising an inner tube of plastic material having a plurality of spaced hollow projections formed integrally therewith and extending outwardly and substantially radially therefrom, said hollow projections being open at both their inner and outer ends and a tubular body of plastic material of greater wall thickness molded about and in contact with said inner tube and having said hollow projections embedded therein and wherein the outer ends of said hollow projections are substantially flush with the outer periphery of said tubular body.

4. A composite screen of tubular form comprising an inner tube of helically wound thermoplastic sheet material having longitudinally extending rows of integral hollow projections extending outwardly and substantially radially therefrom, said hollow projections being open at both their inner and outer ends and being convergent towards the latter and a tubular body of plastic material and substantially greater wall thickness molded about and in contact with said inner tube and having said hollow projections embedded therein and wherein the outer ends of said hollow projections are substantially flush with the outer periphery of said tubular body.

References Cited

UNITED STATES PATENTS

| | | | |
|---|---|---|---|
| 1,647,907 | 11/1927 | Doty | 210—497 X |
| 2,314,477 | 3/1943 | Bodey | 210—497 X |
| 2,757,743 | 8/1956 | Lillie et al. | 166—227 |
| 3,253,714 | 5/1966 | Quinlan et al. | 210—497 X |

FOREIGN PATENTS

| | | |
|---|---|---|
| 1,057,779 | 5/1959 | Germany. |
| 1,140,153 | 11/1962 | Germany. |

REUBEN FRIEDMAN, *Primary Examiner.*

D. M. RIESS, *Assistant Examiner.*